US006205330B1

(12) United States Patent
Winbladh

(10) Patent No.: US 6,205,330 B1
(45) Date of Patent: *Mar. 20, 2001

(54) SYSTEM AND HOST ARRANGEMENT FOR TRANSMISSION OF ELECTRONIC MAIL

(75) Inventor: Hjalmar Winbladh, Saltsjo-Boo (SE)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,749

(22) PCT Filed: Aug. 30, 1996

(86) PCT No.: PCT/SE96/01077

§ 371 Date: Aug. 4, 1998

§ 102(e) Date: Aug. 4, 1998

(87) PCT Pub. No.: WO97/08906

PCT Pub. Date: Mar. 6, 1997

(30) Foreign Application Priority Data

Aug. 30, 1995 (SE) .................................... 9502995

(51) Int. Cl.[7] ...................................... H04Q 7/20

(52) U.S. Cl. ..................... 455/426; 455/466; 379/93.24

(58) Field of Search ........................ 455/466, 403, 455/556, 426, 461, 455, 517, 550, 560, 414, 412; 379/58, 89, 93.18, 93.24, 200.34, 200.43, 872; 370/230, 428, 913, 912, 938; 371/33

(56) References Cited

U.S. PATENT DOCUMENTS

| | | | |
|---|---|---|---|
| 5,588,009 | * | 12/1996 | Will ........................................ 371/33 |
| 5,625,670 | * | 4/1997 | Campana, Jr. et al. ................ 379/58 |
| 5,666,348 | * | 9/1997 | Thornberg et al. .................... 370/230 |
| 5,717,725 | * | 2/1998 | Campana, Jr. ......................... 375/347 |
| 5,742,668 | * | 4/1998 | Pepe et al. .............................. 379/58 |
| 5,757,669 | * | 5/1998 | Christie et al. ................ 364/514.006 |
| 5,757,891 | * | 5/1998 | Wang .................................. 379/93.24 |
| 5,768,509 | * | 6/1998 | Gunluk ............................ 395/200.33 |
| 6,061,718 | * | 8/2000 | Nelson ................................. 709/206 |
| 6,112,078 | * | 8/2000 | Sormunen et al. ................... 455/411 |
| 6,112,099 | * | 8/2000 | Ketola .................................. 455/466 |

FOREIGN PATENT DOCUMENTS

WO 93/16564   8/1993   (WO) .............................. H04Q/7/02

OTHER PUBLICATIONS

Mouly, Michel, et al., "The GSM System for Mobile Communications," Cell & Sys, 1992, pp. 132, and 659–660.

Roth, Wolfgang, "Mobile Data ...".

* cited by examiner

*Primary Examiner*—Edward F. Urban
*Assistant Examiner*—Congvan Tran
(74) *Attorney, Agent, or Firm*—Workman, Nydegger & Seeley

(57) ABSTRACT

The present invention relates to a system and to a host arrangement for transferring electronic mail over a mobile telephone network with the aid of SMS message routing means existing in the network. According to the invention, e-mail is coupled with a modified SMS message containing an agent which, through the medium of control characters, is recognized in the addressed mobile station. A client function in the computer decodes the agent and initiates the transfer of e-mail from the host arrangement, wherein the mail is loaded into the computer from the mobile station, via a PCMCIA connection.

12 Claims, 6 Drawing Sheets

SYSTEM AND HOST ARRANGEMENT FOR TRANSMISSION OF ELECTRONIC MAIL

FIELD OF THE INVENTION

The present invention relates to a system and to an arrangement for transmitting electronic mail over mobile telephone networks with the aid of means existing in the network for routing short text messages, such as SMS-messages. The invention also relates to a method of registering subscribers with electronic mail address. More particularly, the invention relates to an electronic data transmission system wherein the data is linked with a modified short text message. The invention also embodies a local free-standing host arrangement which can be connected to existing mobile telephone networks, subscriber exchanges or switching centres, communication networks, and so on.

DESCRIPTION OF THE BACKGROUND ART

Existing mobile telephone networks include operator services in the form of short message services (SMS) in GSM (Global System for Mobile Communication), i.e. messages (about 100 data characters) which are received and converted to text form in the display of a mobile station (MS), MS displays are only able to accommodate a limited number of characters at a time, and it would therefore be clumsy to receive longer messages via the MS unit, such as text masses included in electric mail possibly together with files (text, graphics, etc.).

In order to route the SMS message through the mobile telephone network to the correct receiver in a mobile telephone network via an address, the network has a GMSC function (Gateway Mobile Switching Centre function) in one or more mobile services switching centres (MSC) in the mobile telephone network. GMSC functions administer telephone traffic for communication systems external of the mobile telephone network. The SMS messages to be routed through the network are linked via the GMSC function to an SMS-centre (SMS-C) which is responsible for routing the message to the correct MS unit, wherewith the MS unit indicates the receipt of SMS messages.

Further GSM, ADC (American Digital Cellular), JDC (Japan Digital Cellular), or other wireless telephone systems and Internet constitute two of the most rapidly developing commercial telecommunications systems. However, it is difficult to communicate between the respective commercial systems. Calling the internet via the GSM system is not particularly practical configuration; air time is expensive, connection waiting times and calls are of long duration, etc. Furthermore, existing internet connections are not optimized for use by mobile telephones.

It will be evident from the a foregoing that there is a need to be able to send longer text messages than SMS messages to mobile telephone subscribers, and the need for simplified solutions for access between mutually different communications system.

SUMMARY OF THE INVENTION

The present invention relates to a system and to an arrangement for transmitting a practically unlimited volume of text and picture data to a subscriber of a mobile telephone network through the medium of an MS unit.

The invention relates to a system for transmitting electronic mail over a mobile telephone network with the aid of short text message routing means existing in the network. The system includes:

means for routing electronic mail from a network which manages such mail and has an interface connected towards means for receiving and storing electronic mail which is allocated a short text message with agent connected to means for connecting data with a mobile telephone switching centre and short text message routing means existing in the mobile telephone network;

means in a mobile station for receiving the short text messages from said existing routing means and storing said messages in the mobile station;

means for establishing a connection between the mobile station and a computer means for transmitting data between the mobile station and the computer, and vice versa; and software containing agent decoding means and instructions for initiating the transmission of electronic mail via said means for establishing a data connection setup.

In one embodiment, the software containing means is installed in a computer.

In another embodiment, the software containing means is installed in a mobile station.

Electronic mail sent from the computer to the host arrangement is allocated a short text message provided with control characters and agent for distribution to another mobile telephone subscriber. The agent includes encryption files, host number, job identity and job pass code. The encryption field can be generated randomly for each short text message.

The invention also relates to a selectively positionable host arrangement for receiving and storing electronic mail and for transmitting electronic mail with the use of the means that exist in the mobile telephone network for routing short text messages to mobile stations, wherein the arrangement includes:

means for receiving and storing electronic mail which is allocated a short text message with agent, and having an interface towards electronic mail routing means; and means for establishing a data connection via local means for telecommunication with a mobile telephone switching centre, and means existing in the mobile telephone network for routing short text messages with said agent to a mobile station.

The present invention also relates to a method for registering subscribers with an electronic mail address in systems for transmitting electronic mail over a mobile telephone network with the aid of network existing short text message routing means, wherein electronic mail is allocated a short text message that includes an agent which is used to initiate transmission of electronic mail between a communications network and mobile stations connected to transmission software, and vice versa, wherein the software is installed in a computer;

wherein installed software automatically calls an electronic mail receiving and storing means upon initiation of the software;

wherein installed communications software commands a user (client) to insert desired electronic mail addresses, personal information, mobile station subscriber number, software initiation password, and information relating to user computer configuration; and in that electronic mail receiving and storing means sends an activation code to the computer with installed software through the medium of a short text message, said code being used to activate software for receiving and transmitting electronic mail with agent.

The activation code can be inserted manually in the software in order to terminate the installation.

Alternatively, activation can be effected automatically with the use of a modem that supports handling of short text messages.

In one embodiment, the software can be taken to the computer from the network, for instance from a home side in the network.

It is beneficial, and at times even desirable, to effect a handshake between the host arrangement and the computer with a PIN code as soon as possible upon receipt of the message.

BRIEF DESCRIPTION OF THE DRAWINGS

The invention will now be described in more detail with reference to preferred embodiments thereof and also with reference to the accompanying drawings, in which.

DETAILED DESCRIPTION OF PREFERRED EMBODIMENTS

The present invention is described in the following with reference to embodiments thereof and also with reference to the CSM system and its function with respect to short text messages (SMS), although it will be understood that the invention is not restricted to any specific wireless telephone system such as GSM and its function for short text messages (SMS), and that other telecommunications systems that include the transmission of short text messages or are expected to include this function in the future, such as the standards ADC, JDC, etc., can be used in conjunction with the invention.

Data packet transmission networks can also be notified in one or more packets with an agent in accordance with the invention. The agent is described in more detail below.

The term e-mail as used with reference to the present invention shall be understood in its widest meaning to include digital communication of e-mail files, facsimiles, pagers, etc.

Figure 1:
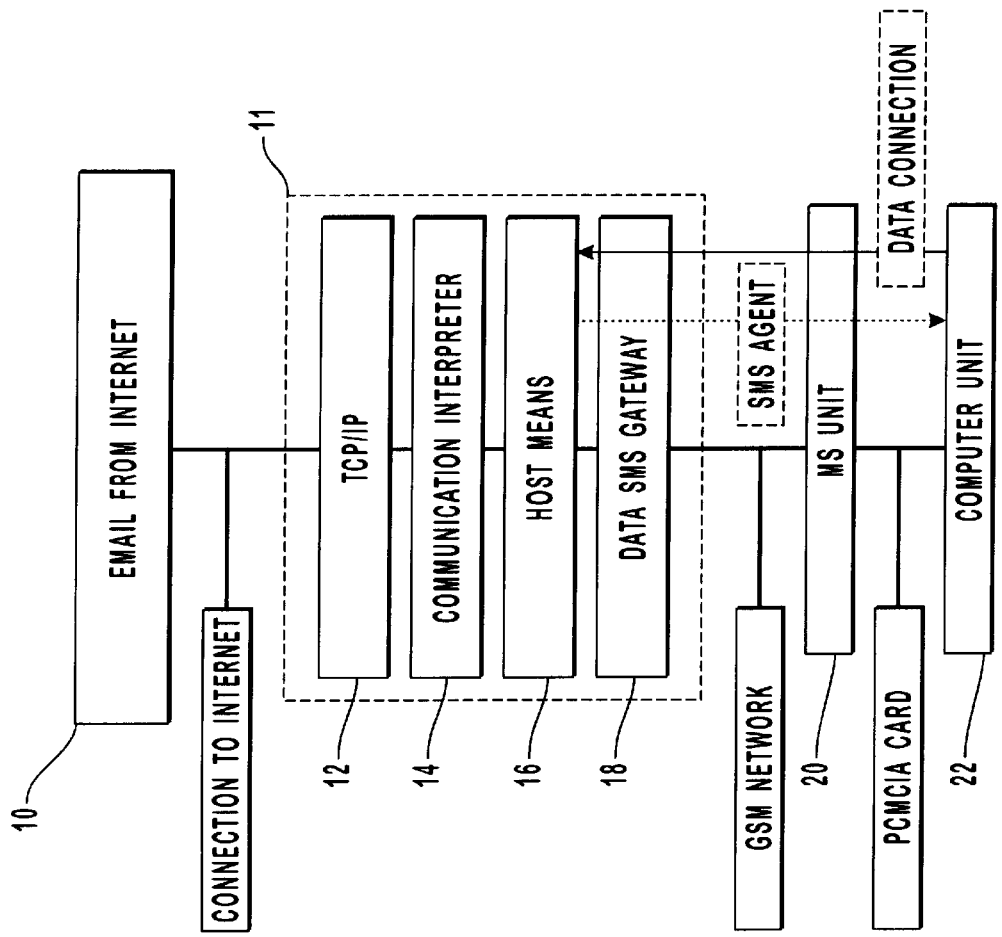
FIG. 1 is a flow chart which illustrates routing of electric mail via SMS in accordance with the present invention.

FIG. 1 is a flowchart which presents an overview of how a mobile telephone subscriber obtains access to information from an external communications network, e.g. Internet, separate from the mobile telephone network according to the present invention.

In block 10, the subscriber receives an e-mail from Internet, said subscriber having the e-mail address abon.nent@teleoperator.mail.se. In this case, the Teleoperator is a company which provides mobile telephone services and which has a host arrangement (11) connected to the mobile telephone network according to the invention. The host arrangement 11 is comprised of interfaces and means 12, 14, 16 and 18. The Internet communication is routed through an Operator which supplies lines or trunks for telephone and/or data communication, for instance Transpac®, in FIG. 1 via a 64-kbit line to the host arrangement 11.

The interface 12 includes a communication protocol, e.g. TFC/IP (Transmission Control Protocol/Internet Protocol), for transmission between, e.g., Transpac® and the host arrangement 11. The interface 12 is also connected to a communications interpreter, e.g. WinSocket®14, which translates the data received to a format suitable for storage in the host means 16 of the host arrangement 11. The means 18 is a Data-SMS Gateway, i.e. a means having the function of connecting itself with the mobile telephone network via a modem or directly digital via routes, and is connected to SMS-C. In the present embodiments, administration of the host arrangement 11 is effected by means of Windows® applications, for instance.

There now follows an example of communication established via Internet towards the mobile station (MS) in accordance with invention, with continued reference to FIG. 1.

The invention uses a version of an SMS message that has been modified in accordance with the invention insofar that the SMS message has been provided with an SMS agent having a data field. An agent encryption code can be generated randomly for each SMS message through the medium of a random generator. The code may include selected character positions in the SMS message in which a function that is included in communications software 46 in a computer 22 for decoding and initiating transfer of e-mail can find relevant information. The SMS message preferably retains its present configuration with about 160 character positions.

E-mail 10 from Internet is stored in the host unit 16 and is coupled with an SMS message. Storage is effected with a file address, e.g. emailout.db, wherewith the host unit 16 initiates the SMS message coupled with emailout.db to the Gateway means 18 with the following text message for instance, followed by control characters or code characters, wherein the character string within the citation marks is shown in the MS display window of the address subscriber "E-mail:,Abon.doc 376 kbyte, avs xxx.yyy@sendit transmission time about 1.5 min. Activate PC and start abcdmail" 45445564674545477046563233#¤/(#))#!/")))))¤###¤. (150 characters). The characters following the last citation sign constitute the SMS agent. The SMS message may optionally be given a prefix which indicates that the message is modified message, so that a PC 22, computer or an MS unit with sufficient memory and data processing capacity is able to process the message as a modified message.

Because a subscriber may be known under several addresses in e-mail, a subscriber in the host arrangement 11 receives a primary address and possible at least one alias address. The SMS message is decoded so as to obtain access to emailout.db with the aid of the SMS agent, which discloses the correct access code to emailout.db for establishing a data connection with the host arrangement 11 given in the agent, so that e-mail can be transmitted via the MS unit 20 and preferably a PCMCIA connection (Personal Computer Memory Card International Association; standard) to a PC 22 for instance, or some other computer. The transmission can also be effected through some other known transmission between the I/O ports of an MS unit for a computer, such as wireless transmissions with infrared light, radio waves, ultrasound, laser light, other electromagnetic radiation, and so on.

When the SMS message command "Activate PC" is followed by connecting a PCMCIA card between the MS unit and the PC unit or some other computer, the SMS agent is decoded by a client function or communications software in the PC unit, therewith providing information as to from where emailout.db can be collected. In the future, when a mobile station can be expected to consist of a computer hybrid, the SMS agent decoding functions may be included in the MS unit.

According to the invention, the term agent will preferably be interpreted as a data field in an SMS message modified in accordance with the invention, which enables initiation and transmission of e-mail by decoding the data fields. The agent contains information which clarifies the place in the SMS message from which the communications software collects necessary information.

Gateway 18 connects itself to the mobile telephone network and sends the SMS message via the function SMS centre (SMS-C) existing in the network and monitors the transmissions. The SMS message is read by the MS unit 20 subsequent to the message being routed to the corrected MS unit in the network via SMS-C. When the PCMCIA card is connected between the PC unit 22 and the MS unit 20, there is activated a sub-program of a Gateway communications software in PC unit 22 or the computer, this sub-program dealing with functions associated with data setup and collection of e-mail, for instance designated "Collect e-mail", therewith displaying, for instance, the following text on the display screen of the PC unit 22, "An e-mail, Abon.doc 375 kbyte, avs xxx.yyy@sendit, transmission time about 2 min."

There are given in the following some examples of how the subscriber is able to activate a data transmission initiating string in the SMS agent with the aid of defined function buttons in the PC unit 22:

"Collect e-mail now"—Activate a GSM data coupling to the host means

"Collect e-mail later"—Store agent as C:\MS unit \LATER\subs.doc?"Yes" or "No"—and so on.

"Collect e-mail later"—Show all stored SMS agents—etc. (this function replaces the above function when the subprogram is started-up without the SMS agent read in).

"Forward e-mail"—"Save copy"—"to whom"—activate address book, pager, facsimile—etc.

"Delete e-mail"—"are you sure . . . "—etc.

"Any e-mail to pick up?"—Send an SMS query to the host means 16 asking whether there is any e-mail to be collected.

These procedures are only given by way of example and are intended to demonstrate the principle of unsable functions of defined function buttons. The hyphens indicate functions and queries that are initiated when pressing buttons.

When the subscriber indicates the e-mail read-in function key, a data connection is automatically obtained with the use of information contained in the SMS agent. E-mail is read-in and stored and is shown possibly in the PC unit 22. Upon termination of the session, the Gateway communications program in the PC unit adjusts to read-in further SMS agents.

The broken line arrow in FIG. 1 indicates a GSM data connection to the host arrangement 11 for querying in accordance with the above function button. The full line arrow in FIG. 1 denotes a data connection for collecting e-mail stored in the host means 16.

In one embodiment, the modified SMS message including the agent is configured with the following data fields:

Text field
 [Prefix]—shows that the SMS message includes an agent, e.g. /e-mail/.
 [Free text]—optional text, e.g. "You have a new e-mail . . ."
Agent field
 [Encryption]—agent field encryption code.
 [Host No.]—shows on which subscriber number e-mail is found.
 [JobId]—identifies the job to be collected in the data SMS Gateway means.
 [FWD]—job password.

The communications software in the PC unit 22, or in some other computer, obtains via the encryption field information necessary in accordance with the aforegoing to read the SMS message and, in this way, obtain access to emailout.db in the present example.

Figure 2:
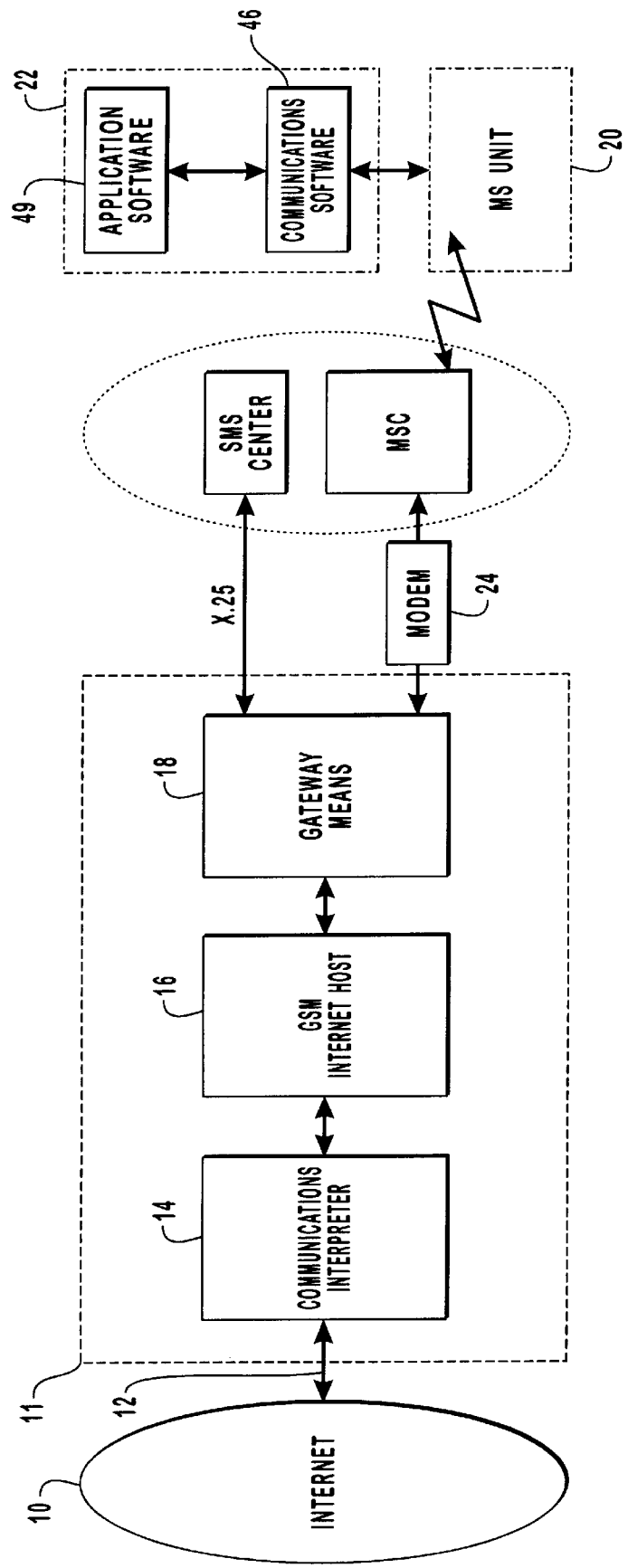
FIG. 2 is a block schematic illustrating an inventive system.

FIG. 2 is a block diagram illustrating an inventive system. The Figure illustrates the host arrangement 11 in the system connected to Internet 10. The Gateway means is connected to the mobile services switching centre, MSC, in the GSM mobile telephone system (dotted in the Figure) via modem 24. The mobile services switching centre, MSC, establishes communication between the SMS centre in the mobile telephone system for routing SMS messages and communications software 46 and applications software 49, i.e. e-mail coupled with a modified SMS message. The agent is sent from the host arrangement 11 to the SMS centre, and vice versa, via an X.25 communication, for instance.

Figure 3:
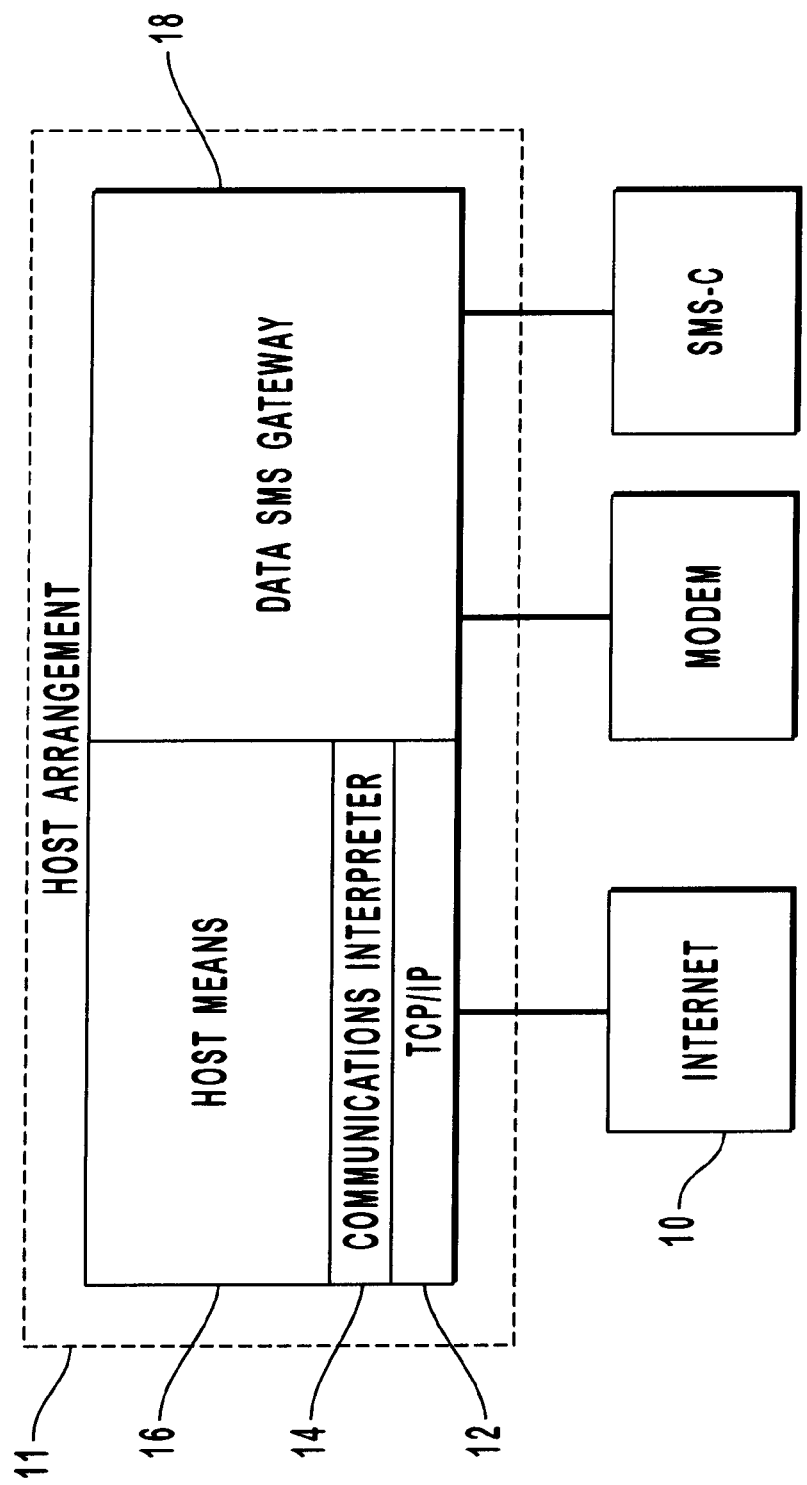
FIG. 3 is a block schematic illustrating an inventive host arrangement.

FIG. 3 illustrates the host arrangement 11 as a unit in block form, wherein the block represents communications protocol 12 TFP/IP connected to Internet for instance, communications interpreter WinSocket® for instance, and the Data SMS Gateway means 18 which is connected to modem 24 as a modem bank or modem pool for instance, and to the router SMS-C. The host arrangement 11 of FIG. 3 is locally free-standing and can therefore be placed in accordance with customer specifications via a modem or telephone exchange for connection with a mobile telephone network.

In one embodiment, the host means 16 may include the following databases:
 CUSTOMER.DB customer database
 SUBSCRIBER.DB subscriber database
 EMAILIN.DB accumulated databases for incoming e-mail
 EMAILOUT.DB accumulated databases for outgoing e-mail The database EMAILOUT.DB thus provides the function of transmitting e-mail from the computer 22 to the host arrangement 11 for distribution of e-mail with allocated SMS with agent to other e-mail addresses in mobile telephone systems, by virtue of the host arrangement allocating control characters and agents to e-mail with SMS.

Figure 4:
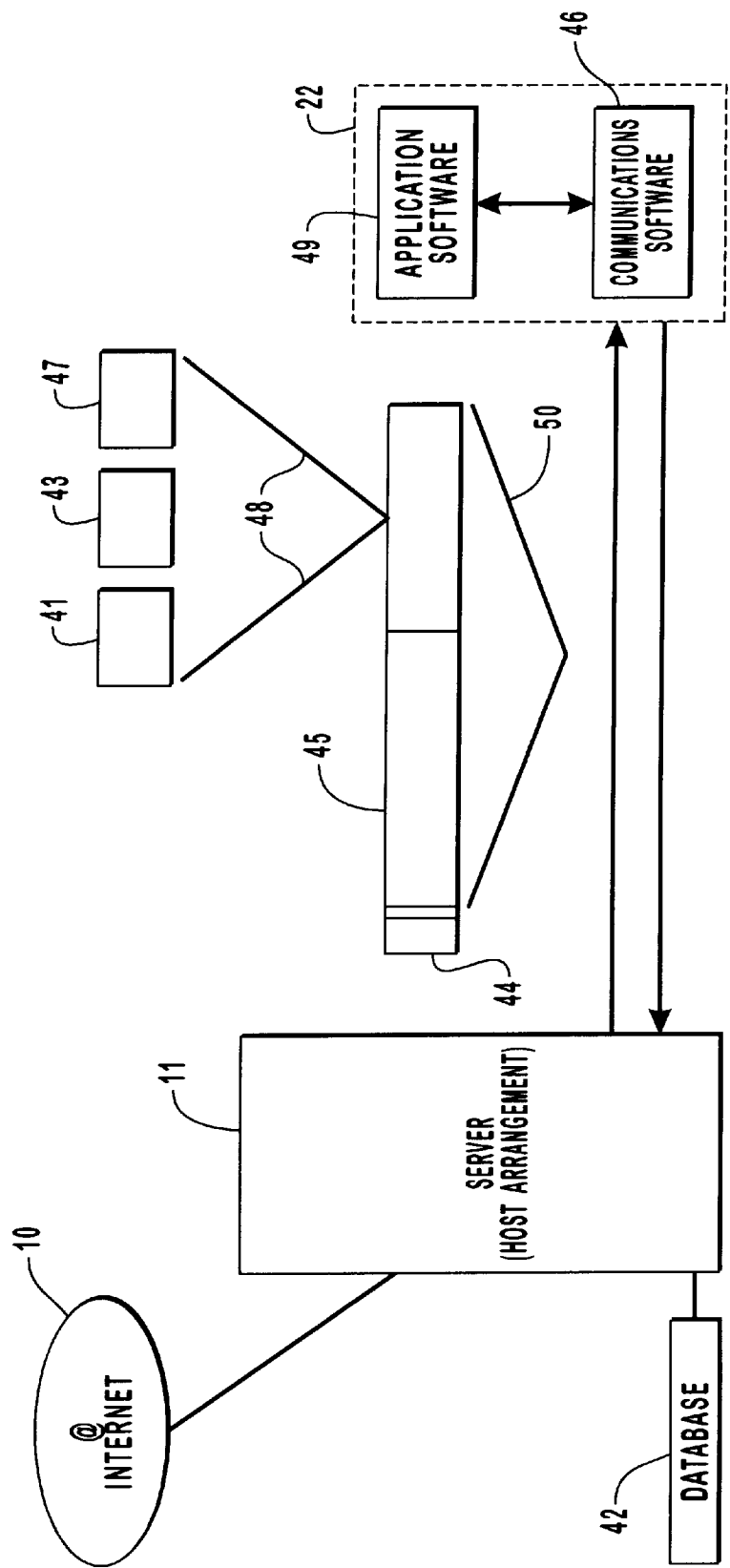
FIG. 4 illustrates diagrammatically the transmission of e-mail via SMS with agent in a system constructed in accordance with the invention.

FIG. 4 summarizes and illustrates schematically the transmission of e-mail via an SMS with agent in an inventive system. The mobile telephone system is not marked in FIG. 4, but is understood for illustration purposes as being transparent to information transmissions in accordance with the invention. The arrows in FIGS. 4–6 indicate communication between included units.

E-mail that arrives via Internet 10 is converted to receiver destination or receiver address, sender address, appropriate headings, text body and to optionally enclosed files stored in a database 42 in the host arrangement 11 according to the invention, which in the illustrated case has the form of a server 11 designated IGSA Server (Internet GSM Smart Access Server).

An arrived e-mail creates an SMS 50 which is sent to the MS unit 20 of the e-mail addressee. The SMS message is comprised of the following information:

a. An application prefix, e.g. "/e-mail:" 44, wherein the prefix denotes that SMS is an e-mail agent containing a control code for the applications software 49 that a communications software 46 shall recite for access to transmitted e-mail found in a computer 22 connected to and MS unit or to a resident in the MS unit 20.

b. E-mail notification 45 including text to the receiver containing information, such as:
   Type of errand.
   Sender.
   Number of files and their types, e.g. text of graphics, etc.
   Transmission time in a GSM system.
   Size of e-mail, e.g. in bytes.

c. Agent part 48 with information for the communications software 46 and, in certain cases, for the applications software 49, such as:
   A field "Job_id" 41, which gives a work notation for e-mail stored in the server 11.
   A field "Code" 43 which gives a password for obtaining the access-right to download an intended "Job_id" in, e.g., a database connected to communications software 46.
   A field "DSG address (Data SMS Gateway Address)" containing the address and/or telephone number of the server 11 in which intended e-mail has been stored.

SMS 50 is stored in an MS unit, often a cellular telephone, where communications software 46 can read the notified information 45. The receiver is able to read all SMS 50 stored in the MS unit 20, by connecting the MS 20 to a computer 22 having activated communications software 46, and transfer the SMS 50 with the correct prefix to intended applications software 49, for instance the applications software denoted by the prefix "/e-mail:". Thus, different versions of the application software 49 or other functions can be denoted with other appropriate prefixes. Thus, an unlimited number of applications software 49 can be connected to a communication software 46.

According to the aforegoing, the correct applications software 49 is activated by the communications software 46 through the medium of the prefix, and notification information 45 is shown in the computer unit 22 together with specific possible commands, such as the functions:
   "Get Now"
   "Get Later"
   "Delete Mail"
   Etc.

For instance, when the "Get now" function is activated, the communications software 46 reads the agent-part 48 of SMS and executes the following procedures:
1. Calls the number in the "DSG address" 47 (start of a session).
2. Subsequent to having established a call setup transfers "Job_id" 41 and "Code" to the server 11, which verifies the information and when finding agreement commences the transmission of data in the same session.
3. Releases the transmitting part of the session when transmission is terminated.

Upon completion of the session, the communications software 46 re-adopts an SMS-read setting and continuously reads the connected MS unit 20 in accordance with new notification agents.

The procedure of downloading data in the applications program 49 can be automated when necessary via the SMS agent, i.e. in the case of certain types of message the command "Get Now" can be initiated automatically by the SMS agent.

Figure 5:
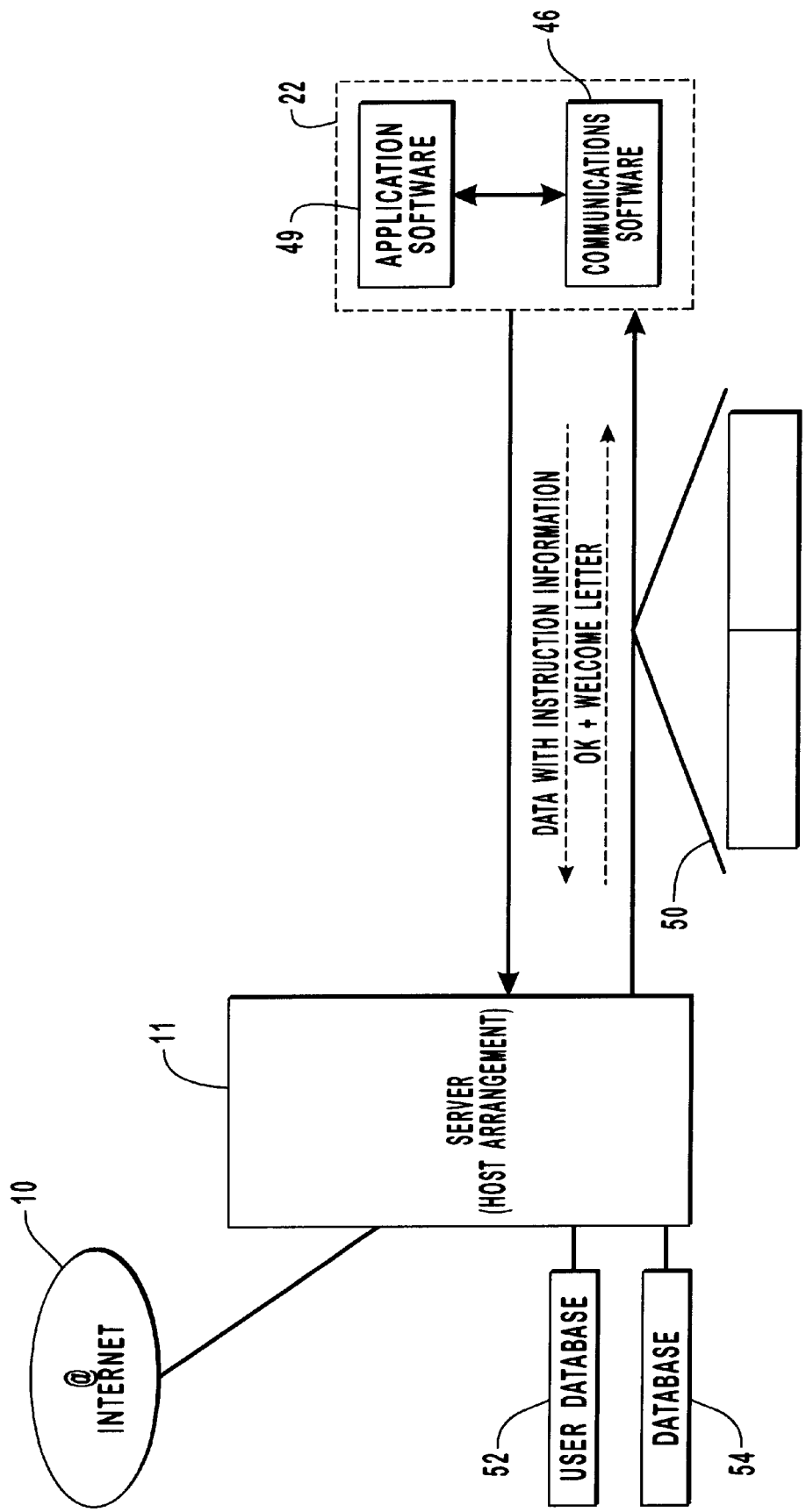
FIG. 5 illustrates diagrammatically automatic registering of an e-mail address for access to Internet in accordance with one embodiment of the invention.

With reference to FIG. 5, the present invention also includes an embodiment for automatically registering a client, subscriber, user or customer of the inventive SMS system.

The communications software 46 is installed, e.g., in the harddisk of a computer 22 via downloading from a diskette or alternatively from Internet via, e.g., a www.homeside (world wide web—home side). The communications software 46 installation program and, in some instances, the program for installing applications software 49, identifies the modem used and makes adjustments therefor.

When starting-up newly installed software 46 at the beginning of a session, the software automatically calls the server 11 and feeds-in user data required by the communications software 46, this user data possibly comprising parameters such as desired e-mail address with alternatives 1, 2, 3, etc., personal identification number, subscriber number to MS unit 20, desired password when manually downloading e-mail and starting-up software, and information concerning the configuration of a user computer 22 intended for the user database 52 in which all users are registered.

The commenced data session for automatically registering an e-mail address in the server 11 is maintained while the server 11 checks an e-mail address desired by a user in the user database 52, for instance with respect to whether the chosen address is unique or not.

During an ongoing session, a check is made in a special database designated "Bad name db" 51 as to whether or not the chosen address is suitable. For instance, unsuitability may have many causes, for example the wrong country code may have been given. Furthermore, many words are reserved for use as command words in the system or unallowed because they give offense, etc.

When the automatic registration of an e-mail address has a positive outcome, there is sent a welcome letter or welcome information which includes the accepted e-mail address, possible alias addresses and advice to the newly registered user. The aforesaid data session is indicated by the full line arrows in FIG. 5, wherein the broken line arrows indicate data transmitted during the session.

The communications software 46 thereafter shows an activation window on the display of computer 22, asking the user to insert an activation code, which is sent from the server 11 via an SMS. In this way, registration according to the aforegoing is confirmed independently of automatic registration, via a modified SMS used for identifying an installing subscriber, which thereafter is the method by which e-mail is sent and received by a user registered in the user database 52.

Manual insertion of the obtained code via the activation window activates the communications software 46 for the possibility of sending and receiving e-mail as before mentioned.

When using a modem which supports SMS handling, as certain GSM modems do, activation takes place fully automatically via the communications software 46, i.e. therewith enabling the procedure using the activation window in accordance with the above to be omitted.

However, it is desirable that when receiving the SMS message, the user acknowledges receipt or handshakes with a PIN code, so that the memory space created in the server 11 does not wait around in the offing for unauthorized use, so to speak.

Figure 6:
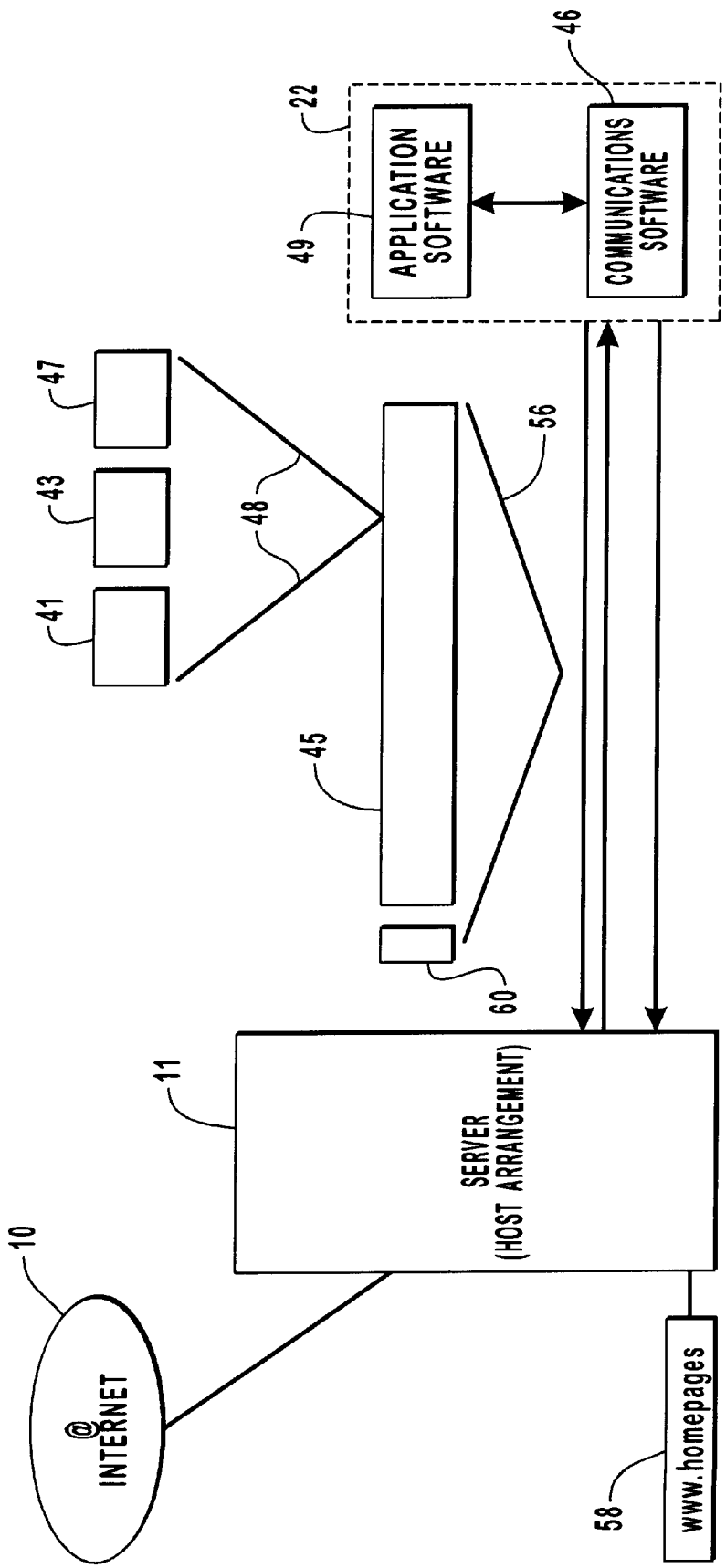
FIG. 6 illustrates diagrammatically the manner in which a user of the inventive system can download information from Internet.

In one embodiment of the present invention shown in FIG. 6, it is possible to place queries and search for information in a communications system such as Internet, for instance, via the server 11, which is here designated SMS Quary 56. Alternatively, queries/searches can be asked and/or made by a data connection with the server 11. The server 11 then downloads Internet material relating to the query or search and notifies the user via an SMS in accordance with the SMS procedure using an agent in accordance with the present invention, wherein agent handling in the communications software 46 downloads the requested information from Internet. The prefix for the embodiment according to FIG. 6 is here designated "Quary prefix" 60. In other respects, the SMS Quary includes the agents 41, 43, 47 as earlier. The SMS agent may also include more control codes than the aforesaid control codes 41, 43 and 47.

Available bandwidths, such as the GSM bandwidth of 9.6 baud +compression is used in the event of capacity bottlenecks on Internet with full downloading in the server, which automatically compresses the data, wherein the communications software 46 automatically packs-up downloaded information for presentation via the applications software 49 in the computer unit 22.

Queries/searches can be placed in the communications software 46 and/or in the applications software 49 for downloading Internet www.homepages 58.

Other operator updatings, operator settings of new services for the user (the client), for instance news bulletins via www, weather reports, etc., can be sent via SMS in accordance with the present invention.

Although the present invention has been described with reference to preferred exemplifying embodiments thereof, it will be understood that the invention is not restricted to these embodiments. Further embodiments of the invention will be evident to one skilled in this field from the scope of the following claims.

What is claimed is:

1. A method of a server, which server is operatively connected to a mobile telephone network, such as a GSM system, and to an external network, such as the Internet, for transferring electronic mail between the external network and a mobile telephone subscriber of the mobile telephone network the method comprising the steps of:

storing an electronic mail received from said external network and addressed to said mobile telephone subscriber;

forming an agent byte sequence that includes field with coded information, wherein one field includes information identifying said electronic mail and another field includes information identifying said server;

initiating transmission of an SMS message to a mobile station of said mobile telephone subscriber, wherein said agent byte sequence is included in the user text part of the SMS message; and transmitting said electronic mail, upon a request from said mobile telephone subscriber, which request includes identifying information of said electronic mail, to said mobile station using a data connection provided by said mobile telephone network.

2. The method as claimed in claim 1, wherein said agent byte sequence is composed of a character string.

3. The method as claimed in claim 1, wherein said data connection used for transmitting said electronic mail is established between said server and said mobile station by receiving and accepting a call from said mobile station, and wherein said data connection initially is used by the server for receiving said request from said mobile telephone subscriber.

4. The method as claimed in claim 3, wherein said information identifying said server corresponds to a server host telephone number in accordance with a telephone numbering plan.

5. The method as claimed in claim 4, wherein said data connection is a GSM speech channel.

6. A server being operatively connected to a mobile telephone network, such as a GSM system, and to an external network, such as the Internet, for transferring electronic mail between the external network and a mobile telephone subscriber of the mobile telephone network, the server including:

storage means for storing an electronic mail received from said external network and addressed to said mobile telephone subscriber;

first means for forming an agent byte sequence that includes fields with coded information, wherein one field includes information identifying said electronic mail and another field includes information identifying said server;

SMS gateway means for operatively connecting the server to an SMS center, which SMS center is provided by said mobile telephone network for routing SMS messages;

second means for initiating transmission of an SMS message, which message includes said agent byte sequence in its user text part, from said SMS center to a mobile station of said mobile telephone subscriber;

data gateway means for connecting the server to a data connection provided by said mobile telephone network between said mobile station and the server; and third means for transmitting said electronic mail, via the data gateway means and the data connection, to said mobile station in response to a request from the mobile station, said request including identifying information of said electronic mail.

7. The server as claimed in claim 6, wherein said first, second and third means are program code instruction means to be executed by a processing unit included in the server.

8. The server as claimed in claim 7, wherein said agent byte sequence is composed of a character string.

9. The server as claimed in claim 6, wherein said data connection used for transmitting said electronic mail is established between said server and said mobile station by receiving and accepting a call from said mobile station, and wherein said data connection initially is used by the server for receiving said request from said mobile telephone subscriber.

10. The server as claimed in claim 9, wherein said information identifying said server corresponds to a server host telephone number in accordance with a telephone numbering plan.

11. The server as claimed in claim 10, wherein said data connection is a GSM speech channel.

12. The server as claimed in claim 11, wherein said first, second and third means are program code instruction means to be executed by a processing unit included in the server.

* * * * *

UNITED STATES PATENT AND TRADEMARK OFFICE
CERTIFICATE OF CORRECTION

PATENT NO.    : 6,205,330 B1
DATED         : March 20, 2001
INVENTOR(S)   : Hjalmar Winbladh It is certified that error appears in the above-identified patent and that said Letters Patent is hereby corrected as shown below:

Column 1,
Line 10, after "mail" change "address" to -- addresses --
Line 23, after "about" change "100" to -- 160 --

Column 3,
Line 40, after "the" change "CSM" to -- GSM --

Column 4,
Line 8, change "TFC/IP" to -- TCP/IP --
Line 56, after "and" change "possible" to -- possibly --

Column 5,
Line 31, after "Abon.doc" change "375" to -- 376 --

Column 6,
Line 16, change "[FWD] to -- [PWD] --
Line 36, after "12" change "TFP/IP" to -- TCP/IP --

Column 7,
Line 14, before "MS" change "and" to -- an --

Column 8,
Line 40, after "name db" change "51" to -- 54 --

Column 9,
Line 55, after "includes" change "field" to -- fields --

Signed and Sealed this

Twelfth Day of March, 2002

Attest:

JAMES E. ROGAN
Attesting Officer    Director of the United States Patent and Trademark Office